(12) United States Patent
Yoshimura et al.

(10) Patent No.: US 7,012,770 B2
(45) Date of Patent: Mar. 14, 2006

(54) MAGNETIC TRANSFER APPARATUS AND METHOD FOR MAGNETIC RECORDING MEDIUM

(75) Inventors: Hiroyuki Yoshimura, Tokyo (JP); Kiminori Sato, Nagano (JP)

(73) Assignee: Fuji Electric Co., Inc., (JP)

( * ) Notice: Subject to any disclaimer, the term of this patent is extended or adjusted under 35 U.S.C. 154(b) by 0 days.

(21) Appl. No.: 10/658,690

(22) Filed: Sep. 9, 2003

(65) Prior Publication Data

US 2004/0165300 A1 Aug. 26, 2004

(30) Foreign Application Priority Data

Feb. 25, 2003 (JP) .............................. 2003-047912

(51) Int. Cl.
*G11B 5/86* (2006.01)

(52) U.S. Cl. .............................. 360/15; 360/16; 360/17

(58) Field of Classification Search .................. 360/15, 360/16, 17
See application file for complete search history.

(56) References Cited

U.S. PATENT DOCUMENTS

| | | | | |
|---|---|---|---|---|
| 6,721,113 B1 * | 4/2004 | Matsuda et al. | ............... | 360/15 |
| 6,757,116 B1 * | 6/2004 | Curtiss et al. | ................ | 360/15 |
| 6,813,105 B1 * | 11/2004 | Takano | ......................... | 360/17 |
| 6,906,875 B1 * | 6/2005 | Kamatani et al. | ............. | 360/17 |
| 2002/0081018 A1 * | 6/2002 | Hamano et al. | ............ | 382/151 |
| 2004/0224458 A1 * | 11/2004 | Higashi | ...................... | 438/202 |

FOREIGN PATENT DOCUMENTS

JP  11-175973 A  7/1999
JP  2002-319128 A  10/2002

OTHER PUBLICATIONS

"Magnetic Printing Technology", K. Sato et al.; Abstract; Fuji Electric Journal; vol. 75 No. 3; pp. 173-177 (2002).

* cited by examiner

*Primary Examiner*—David Hudspeth
*Assistant Examiner*—Adam R. Giesy
(74) *Attorney, Agent, or Firm*—Rossi, Kimms & McDowell, LLP

(57) ABSTRACT

A magnetic pattern of a master disc is transferred to both sides of a magnetic recording medium with no displacement. The origin of a magnetic recording medium can be determined by observing the inner or outer periphery of the magnetic recording medium. Back-side alignment marks are formed on the front side of the magnetic recording medium based on the origin thus determined. The back-side alignment marks can be observed with a microscope and front-side alignment marks for the magnetic recording medium can be provided on the back side of the magnetic recording medium. The alignment marks provided on the front/back sides of the magnetic recording medium are aligned with the corresponding alignment marks provided on the master disc, and a magnetic pattern formed on the soft magnetic material of the master disc is can be transferred to the magnetic recording medium.

24 Claims, 10 Drawing Sheets

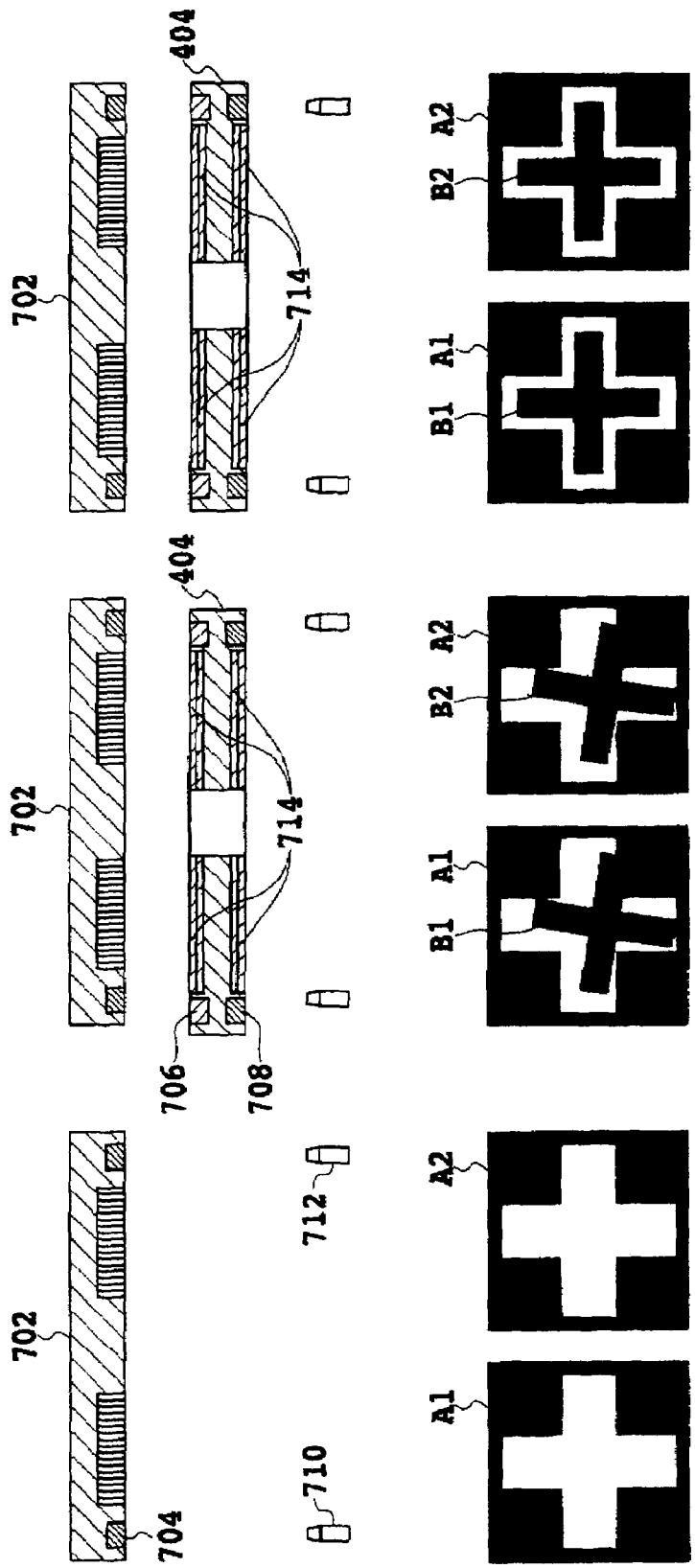

MAGNETIC TRANSFER APPARATUS AND METHOD FOR MAGNETIC RECORDING MEDIUM

BACKGROUND

In hard disc drives (HDDs), data is written/read while a magnetic head is floated from the surface of a rotating magnetic recording medium at a gap of several tens of nm by a floating mechanism (slider). Bit information on the magnetic recording medium is stored in data tracks arranged concentrically on the recording medium surface. The data writing/reading head is moved and positioned to a target track on the magnetic recording medium surface at a high speed to write and read data.

A positioning signal (servo signal) for detecting the relative position between the head and the data tracks is concentrically written on the surface of the magnetic recording medium, and the magnetic head for writing/reading data detects the relative position thereof at a fixed time interval. The servo signal, which is written in a magnetic recording medium using a dedicated device (servo writer) after the magnetic recording medium is installed in the HDD, is used to prevent the head from deviating from the center of the servo signal (or the center of the locus of the head) detected by the head.

The recording density of such a magnetic recording medium reached 100 Gbit/in$^2$ in the case of magnetic recording media under current development, and the storage capacity trend is to increase by 60% or more per year. In connection with the increase of the storage capacity, however, there is a tendency for the density of the servo signal for detecting the relative position between the head and the data track by the head to likewise increase, which increases the writing time of the servo signal, year by year. The increase of the writing time of the servo signal is one factor that reduces productivity of HDDs and increases the cost.

Against this backdrop, a magnetic transfer technique has been developed to significantly shorten the writing time of the servo information by collectively writing the servo signal in a magnetic recording medium, as compared with the system of writing a servo signal by using a signal writing head of the servo writer as described above. FIGS. 8A–8C, 9A, and 9B illustrate this technique. This technique involves an initial demagnetizing step where a permanent magnet 82 for demagnetization is moved while kept spaced from the surface of a magnetic recording medium 81 at a fixed interval or gap of 1 mm or less (FIG. 8A). A magnetic layer formed on the magnetic recording medium 81 is not magnetized in a uniform direction before this step. It is uniformly magnetized in a uniform direction indicated by an arrow by magnetic field leaking between the gap of the permanent magnet 82 (FIG. 9A). FIG. 8B shows the master disc positioning step in which a master disc 83 for magnetic transfer is positioned on the magnetic recording medium. JP-A-11-175973 describes a technique for enhancing the reliability to this positioning step using a marker for positioning between the center of the master disc and the center of the medium. FIG. 8C shows the transfer pattern writing step, in which the master disc 83 is brought into close contact with the surface of the magnetic recording medium 81, and the permanent magnet 82 for magnetic transfer is moved along a movement path indicated by an arrow to perform the magnetic transfer.

FIGS. 9A and 9B are diagrams showing the mutual positional relationship between the permanent magnet and the magnetic recording medium in the initial demagnetizing step and the transfer pattern writing step for magnetic transfer. FIG. 9A shows the positional relationship in the initial demagnetizing step and FIG. 9B shows the positional relationship in the transfer pattern writing step. As shown in FIG. 9B, in the transfer pattern writing step, the master disc and the magnetic recording medium are disposed so that a soft-magnetic-film-side surface of the master disc having the soft magnetic film 95, including a Co type soft magnetic layer embedded in one surface of an Si substrate 94, is brought into close contact with a magnetic-layer-side surface of the magnetic recording medium having a magnetic layer 92 on a substrate 91. The permanent magnet 93 for magnetic transfer is swept around the Si substrate 94 to transfer the magnetic pattern onto the magnetic recording medium.

The soft magnetic film 95 having the Co type soft magnetic layer embedded in the form of a pattern is interposed between the permanent magnet 93 and the magnetic layer 92 so that the magnetic field formed in the Si substrate 94 by the permanent magnet 93 can magnetize the magnetic layer 92 at the portions corresponding to the positions of the soft magnetic film 95 where no Co type soft magnetic layer exists. In the magnetic layer 92 at the portions corresponding to the positions at which the Co type soft magnetic layer exists, the magnetic field passes through the soft magnetic film 95 to form a magnetic route having a smaller magnetic resistance, which is sufficiently weaker as to be incapable of writing a new signal. As shown in FIG. 9B, the direction of the magnetic field for writing the transfer signal is opposite to the direction of the magnetic field for demagnetization.

FIGS. 10A–10E illustrate a method of embedding a soft magnetic layer in a master disc. The embedding method involves the steps of coating a resist layer (FIG. 10A), patterning and developing the resist layer (FIG. 10B), etching an Si substrate using the patterned resist layer as an etching mask to form grooves (FIG. 10C), sputtering soft magnetic material on the Si substrate to form a Co soft magnetic film (FIG. 10D), and removing the extraneous Co film outside the grooves (FIG. 10E).

Specifically, as shown in FIG. 10A, a photoresist layer 1002 of 1 μm thick is coated on the surface of an Si substrate 1001 of about 500 μm thick using a spin coater. The resist layer 1002 is then patterned using a conventional photolithography technique, as in the case of the normal method of manufacturing an Si semiconductor, as shown in FIG. 10B. Subsequently, as shown in FIG. 10C, the exposed surfaces of the substrate 1001 is dry etched with a conventional reactive plasma etching technique using methane trichloride as reactive gas so that the surfaces of the Si substrate 1001 not covered by the resist layer 1002 is removed to a depth of about 500 nm by etching. Furthermore, as shown in FIG. 10D, a Co type soft magnetic film 1003a, 1003b of 500 nm thick is formed by sputtering over the resist layer 1002. Finally, as shown in FIG. 10E, the Si substrate 1001 is immersed in a solvent to dissolve and remove the resist layer 1002 and the Co soft magnetic film 1003b on the resist layer 1002 (by using ultrasonic wave or the like as occasion demands).

Presently, a magnetic film is formed on both sides of a magnetic recording medium to increase its storage capacity in HDDs, as described for example in JP-A-2002-319128. A servo pattern as described above and a data pattern are provided as a magnetic pattern to be recorded in the magnetic recording medium. Many magnetic discs are loaded in a present HDD device, and a magnetic head is individually equipped at each side of each magnetic disc. When a data area is identified, only the head stack assembly (HAS)

associated with the head corresponding to a cylinder in the data area concerned is controlled to move to a predetermined position under the servo control. The other HSAs are not controlled. For example, when a cylinder to be read/written is varied from the front surface to the back surface, if a displacement between the servo patterns on both the surfaces is large, it takes time until the positioning of the HAS on the back surface by the servo control is stabilized, so that the set ring time corresponding to the reading time of data after the cylinder is switched is increased, degrading the access speed of the HDD. Therefore, it is very important for the magnetic patterns on both sides of the magnetic recording medium to be aligned as much as possible so that there is no displacement between the two magnetic patterns.

A conventional target pattern to be magnetically transferred is limited to a servo pattern having a large pattern width because the photo-process technique for forming master discs is based on "$\mu$m-rule." However, in consideration of advancement of utility of magnetic transfer and the photo-process technique and application of "sub-$\mu$m-rule," a data pattern as well as a conventional servo pattern should be considered as a transfer target, and it is required to carry out the magnetic transfer based on a high-density master disc to a magnetic recording medium.

It is very difficult to position and align the magnetic pattern of a master disc for the front side of a magnetic recording medium with a magnetic pattern of the master disc for the back side of the magnetic recording. The present invention has been implemented to solve this problem. There remains a need for a magnetic recording medium that can easily provide magnetic patterns having no displacement between the two sides of the magnetic recording medium. The present invention addresses this need.

SUMMARY OF THE INVENTION

The present invention relates to a magnetic transfer apparatus and method for a magnetic recording medium, and more particularly to an apparatus and method of writing a positioning servo signal of a writing/reading head of data written on the surface of a magnetic recording medium by using a magnetic transfer technique in a HDD using a magnetic film as a storage material.

One aspect of the present invention is a method of magnetically transferring a magnetic pattern from a master disc having soft magnetic material embedded therein to a magnetic recording medium. The method involves determining an origin of a magnetic recording medium by observing an inner or outer periphery of the magnetic recording medium, providing an alignment mark on a first side of the magnetic recording medium based on the origin thus determined, providing an alignment mark on a second side opposite the first side of the magnetic recording medium based on the alignment mark on the first face, and aligning a corresponding alignment mark on the master disc coincident with the alignment mark provided on the first or second side of the magnetic recording medium to transfer a magnetic pattern formed on the soft magnetic material to the magnetic recording medium.

The alignment mark on the first or second side is placed outside a data area where magnetic information on the magnetic recording medium is written/read. The alignment marks on the first and second sides can be formed by a photo process. The alignment mark on the second side can be formed by disposing a photomask at a predetermined position to provide the alignment mark on the second side and recording an image of the photomask, disposing the magnetic recording medium at a predetermined position and observing an image the alignment mark provided on the first side, comparing the recorded image with the observed image, and correcting the position of the magnetic recording medium based on the comparison.

Two or more alignment marks can be provided on the master disc, and two or more alignment marks corresponding to the master disc can be formed on the first or second side of the magnetic recording medium. Each of the alignment marks provided on the respective sides of the magnetic recording medium and the corresponding alignment mark provided on the master disc can be configured to be engageable with each other.

The alignment mark of the master disc can be provided on a side of the master disc where the soft magnetic material is embedded, and the alignment mark provided side of the magnetic recording medium corresponding to the master disc can be located opposite to the side to which the magnetic pattern is transferred by the master disc. Alternatively, the alignment mark of the master disc can be provided at the side opposite to the side where the soft magnetic material of the master disc is embedded, and the alignment-mark provided side on the magnetic recording medium corresponding to the master disc can be a side to which the magnetic pattern is transferred by the master disc.

Another aspect of the present invention is a magnetic transfer device. The device can include a master disc having soft magnetic material embedded on a first side thereof and an alignment mark on one of the first side and a second side opposite the first side, and a magnetic recording medium having at least one alignment mark on each of a first side and a second side thereof. The alignment mark on the master disc is alignable with the alignment mark provided on the first or second side of the magnetic recording medium to transfer a magnetic pattern formed on the soft magnetic material to the magnetic recording medium.

The master disc can have two or more alignment, and the magnetic recording medium can have two or more alignment marks corresponding to the master disc on the first or second side. Each of the alignment marks can be provided on the respective sides of the magnetic recording medium and the corresponding alignment mark provided on the master disc can be engageable with each other.

The alignment marks of the master disc can be provided at the first side of the master disc where the soft magnetic material is embedded, and the alignment marks of the magnetic recording medium corresponding to the alignment marks of the master disc can be located opposite to the side to which the magnetic pattern is transferred by the master disc. Alternatively, the alignment mark of the master disc can be provided at the second side thereof, and the alignment mark of the magnetic recording medium corresponding to the alignment mark of the master disc can be the side to which the magnetic pattern is transferred by the master disc.

BRIEF DESCRIPTION OF THE DRAWINGS

FIGS. 7A–7C schematically illustrate the steps for positioning the magnetic recording medium and the master disc according to the present invention.

DETAILED DESCRIPTION

Figure 1:
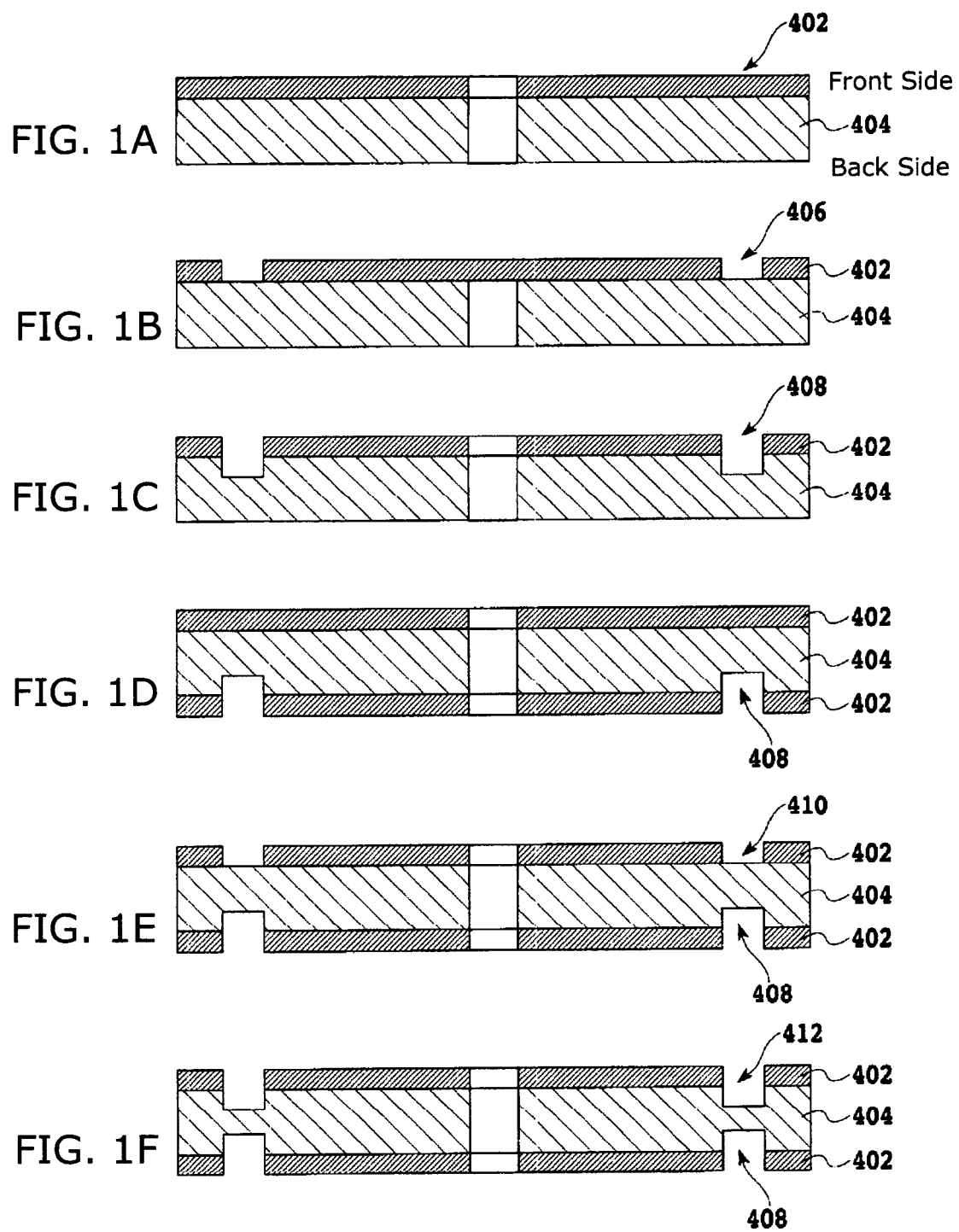
FIGS. 1A–1F schematically illustrate a method of setting alignment marks onto a magnetic recording medium according to the present invention.

A recording medium according to the present has at least one alignment mark on each of its front side (face or surface) and the back side (face or surface). The inner periphery or outer periphery of a magnetic recording medium can be observed by a TV camera to determine the origin (center) of the magnetic recording medium. The origin of a photomask on which an alignment pattern for the front surface is drawn can be aligned with the center, and an alignment mark can be formed on the front side of the magnetic recording medium using a photomask. Subsequently, the alignment mark formed on the front surface of the magnetic recording medium can be observed, and the position of a photomask for the back side of the magnetic recording medium can be adjusted so that an alignment mark formed on the photomask for the back side can be used for positioning the front side with the alignment mark thus observed. Then, the alignment mark for the back side formed on the photomask for the back side can be formed on the back side of the magnetic recording medium.

According to the present invention, the alignment mark on the front side of the magnetic recording medium can be used for positioning the alignment mark of the master disc for the back side, and the alignment mark on the back side of the magnetic recording medium can be used for positioning the alignment of the mask disc for the front side. Accordingly, with respect to the shape and position of the alignment marks, it is unnecessary to make them coincident between the front side and the back side of the magnetic recording material. It is sufficient to make them coincident between respective alignments marks that can be engaged with each other.

The alignment marks can be formed on the magnetic recording medium in reference to an inner hole into which the shaft of a spindle motor is inserted when the magnetic recording medium is installed into the HDD, namely setting the center of a circle inscribing the inner hole as the origin.

A master disc for each of the front and back surfaces on which a magnetic pattern to be magnetically transferred to a magnetic recording medium is embedded can also be provided with alignment marks for positioning on a face of the master disc in which the magnetic pattern is embedded. With respect to the master disc for the front side, the alignment marks thereof can be located at the same positions as the alignment marks for the back side of the magnetic recording medium. With respect to the master disc for the back side, the alignment marks thereof can be located at the same positions as the alignment marks for the front side of the magnetic recording medium. Furthermore, the shapes of the alignment marks can be configured so that the corresponding alignment marks are positively engageable with each other.

The positions and shapes of two alignment marks on the magnetic transfer face of the master disc can be observed and recorded by a CCD camera having an enlarging function or the like. Subsequently, the magnetic recording medium can be inserted into the gap between the master disc and the CCD camera to observe the alignment marks provided on the surface opposite to the magnetic transfer face of the magnetic recording medium, and the differences between the recorded position and orientation of each alignment mark of the master disc and the position and orientation of each alignment mark of the magnetic recording medium thus observed can be determined. A two-directional (X-Y) orthogonal stage and a rotating stage on which the magnetic recording medium can be supported can be moved to align these alignment marks with each other. Thereafter, the magnetic recording medium and the master disc are brought into close contact with each other, and the permanent magnet is rotated around, thereby completing the magnetic transfer to one side of the magnetic recording medium. Subsequently, the positioning function between the master disc and the magnetic recording medium can be carried out for the other side of the magnetic recording medium in the same manner.

Here, the "master disc" means "master information carrier" for transferring a magnetic pattern to a magnetic disc medium. It should be noted that the outer shape of the master disc is not critical, does should not be limited to a disc-shape.

Figure 2:
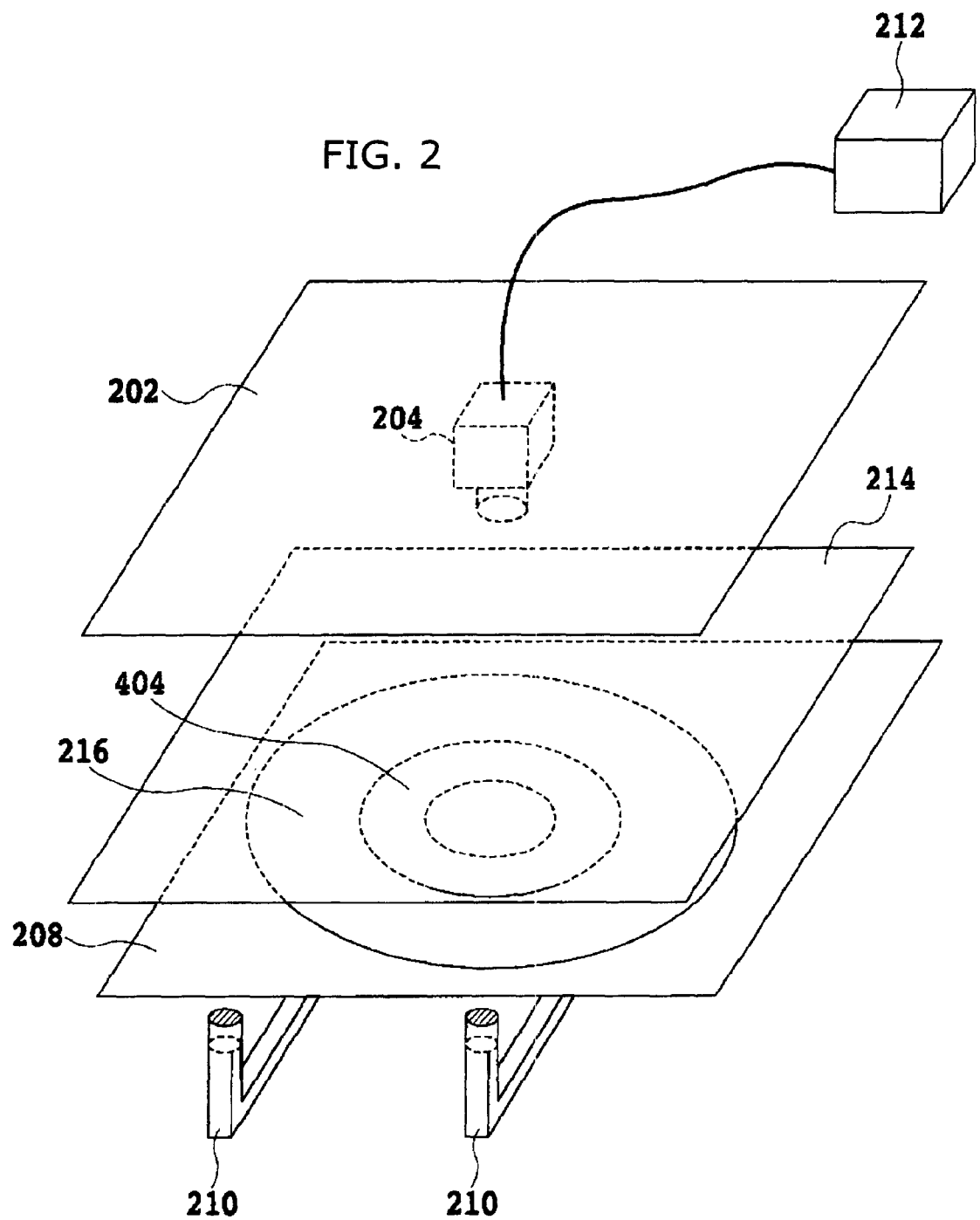
FIG. 2 schematically illustrates a marking device for marking alignment marks onto a magnetic recording medium according to the present invention.

FIGS. 1A–1F illustrate the method of forming alignment marks 408, 412 on both sides (front and back) of a magnetic recording medium 404. A photoresist 402 for patterning alignment marks is coated on one side ("front side" for simplicity of description) of the magnetic recording medium 404 (FIG. 1A). FIG. 2 illustrates a marking device for marking the alignment marks on the magnetic recording medium. The marking device comprises an X-Y stage 202 for a TV camera, namely a CCD camera 204, a signal processing device 212, an X-Y stage 208 and a rotating stage 216 for the magnetic recording medium, and a microscope 210 for observing the alignment marks. The X-Y stage 202 can move the CCD camera 204 in the horizontal direction (along X-Y coordinates) to observe the surface of the magnetic recording medium 404 (or the photomask 214) to detect the edge of the magnetic recording medium and the alignment marks provided on the medium. A high-resolution CCD camera can be used for that purpose. An image signal from the camera 204 is transmitted to the signal processing device 212, which processes the image signal received from the CCD camera 204 to determine the edge of the magnetic recording medium 404 and calculate the origin of the magnetic recording medium 404. The microscope 210 can be disposed so that it can observe the magnetic recording medium 404 (or the photomask 214) from the other side or the "back side."

The photomask 214 is disposed so that it too can be movable in the horizontal direction (along X-Y coordinates). The X-Y stage 208 moves the magnetic recording medium 404 in the horizontal direction (along X-Y coordinates), while the rotating stage 216 rotates the magnetic recording medium 404 disposed thereon (the X-Y stage 208 and the rotating stage 216 can be formed as a single unit (see FIGS.

4A–4C)). The camera 204 can observe the inner hole of the magnetic recording medium 404, and the signal processing device 212 can process the image signal from the camera 204 to determine the center position (origin) of the magnetic recording medium 404.

Figure 3A:
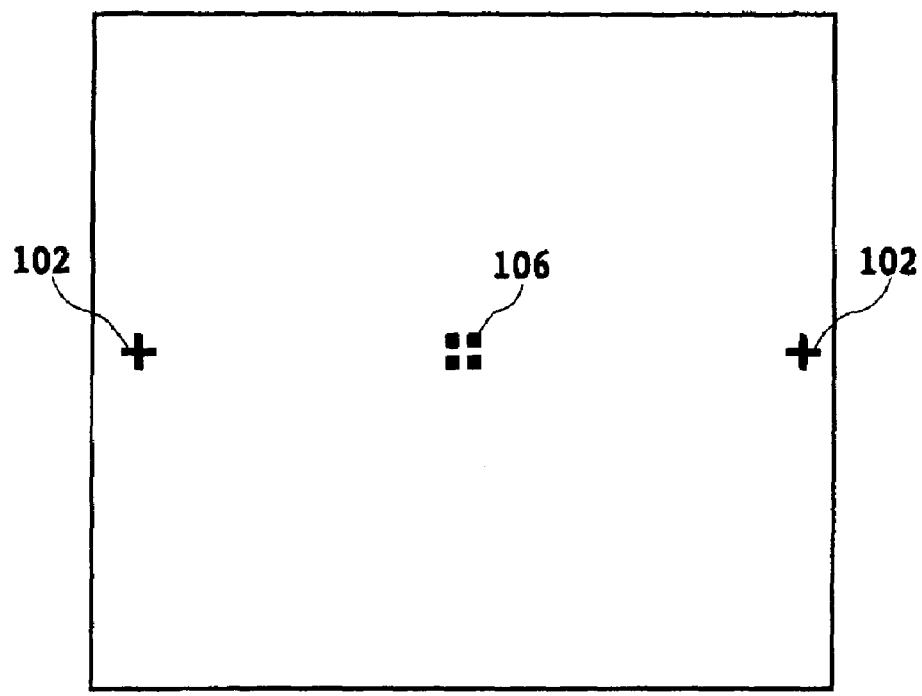
FIGS. 3A and 3B schematically illustrate photomasks having alignment marks for a magnetic recording medium according to the present invention.

Referring to FIG. 3A, a photomask (front-side) for the front side of the magnetic recording medium has a center mark 106 for aligning with the center of the magnetic recording medium, and a pair of alignment marks 102 (left and right sides thereof) for aligning with the back side of the magnetic recording medium. The front-side photomask is adjusted so that the center mark 106 is aligned with the center position of the magnetic recording medium 404, based on the image processing result. The photoresist layer 102 is exposed and developed using the photomask to expose areas 406 thereof corresponding to the alignment marks 102 of the photomask (FIG. 1B). The photoresist layer 402 now can act as a mask for etching the exposed areas 406 of the magnetic recording medium. Next, the alignment marks are etched into the exposed surface of the magnetic recording medium. When the magnetic recording medium is dry-etched using the photoresist 402 as an etching mask, the sites corresponding to the alignment marks having no resist are etched to form recesses 408, which can constitute the alignment marks 304 for the back side of the magnetic recording medium (FIG. 1C).

Figure 3B:
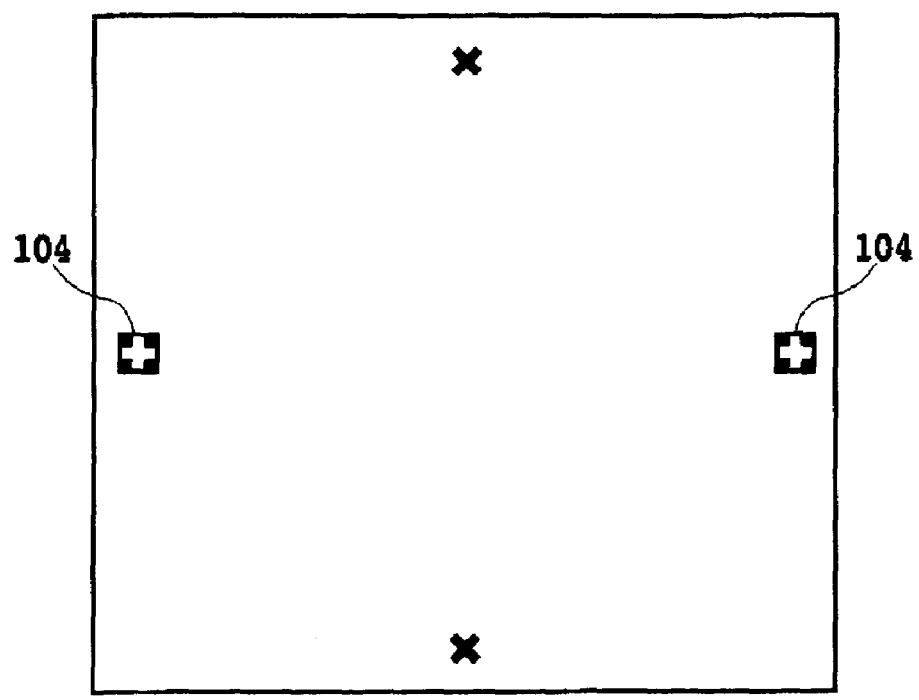
Figure 4A:
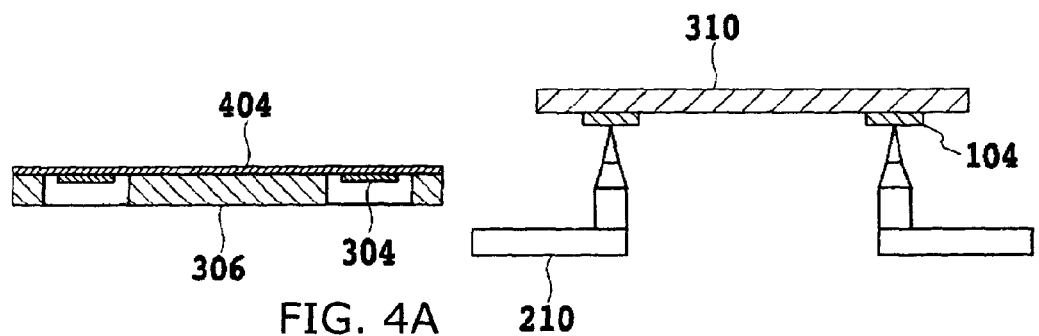
FIGS. 4A–4C schematically illustrate a method for adjusting the alignment marks onto the magnetic recording medium according to the present invention.

Similarly, the back side of the magnetic recording medium 404 is coated with a photoresist 402 for patterning alignment marks (FIG. 1D). The back side can be patterned to form alignment marks by providing a photomask (back-side) with two alignment marks for aligning with the front side of the magnetic recording medium 404 at the right and left sides of the photomask (FIG. 3B). Referring to FIG. 4A, which illustrates a magnetic recording medium 404 formed with the alignment marks 304 for the back side on the front side thereof on a combined X-Y and rotating stage 306, the back-side photomask 310 is positioned so that the microscope 210 can observe the alignment marks 104 and record the image observed from below. When the alignment marks are provided on the back side, the photomask is disposed at a predetermined position, and the image of the photomask is recorded.

Figure 4B:
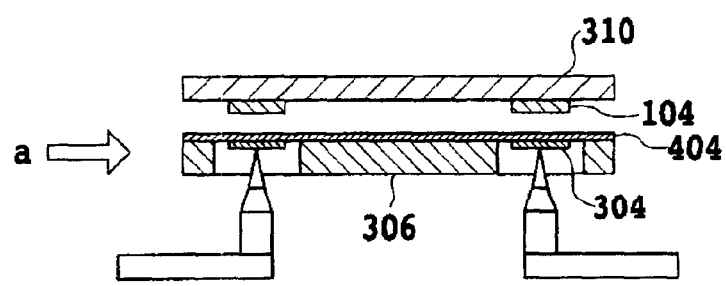
Figure 4C:
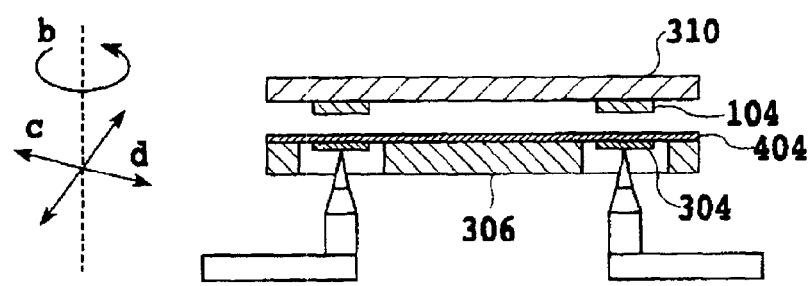

Referring to FIG. 4B, the combined stage 306 can be moved in a direction of the arrow a to align the magnetic recording medium 404 with the photomask 310. Referring to FIG. 4C, the microscope 210 observes the alignment marks 304 for the back side formed on the front side of the magnetic recording medium 404, and the processing device 210 compares the observed image with the recorded alignment marks. Based on the comparison result, the stage 306 is moved in directions indicated by arrows b, c, and d to correct the displacement amount.

In the pre-stage, light is exposed from the upper side of the back-side photomask while the alignment marks for the back side are aligned with the recorded alignment marks to form alignment marks (front-side) on the back side of the magnetic recording medium 404. When the back-side photoresist layer is developed, the photoresist layer 402 at the sites 410 corresponding to the alignment marks is removed so that the photoresist 402 can act as a mask for etching (FIG. 1E). Next, alignment marks are etched on the back side of the magnetic recording medium. When the exposed sites 410 of the back side is dry-etching using the photoresist 402 as an etching mask, the sites 410 corresponding to the alignment marks having no photoresist 402 are etched to form recesses 412 (FIG. 1F), which correspond to the front-side alignment markings. Unnecessary resist remaining on the magnetic recording medium is dissolved and removed by a resist exfoliating agent, and the magnetic recording medium 404 with recessed marking at the sites corresponding to the alignment marks is completed.

Figure 5A:
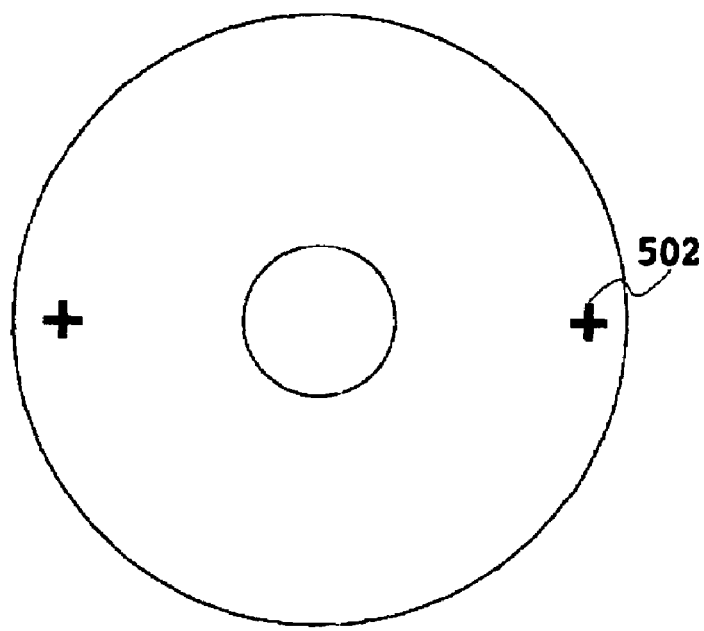
FIGS. 5A–5C schematically illustrate the magnetic recording medium having the alignment marks according to the present invention.
Figure 5B:
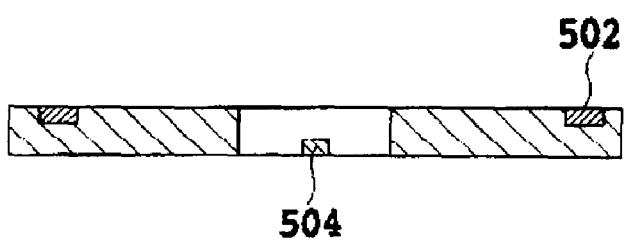
Figure 5C:
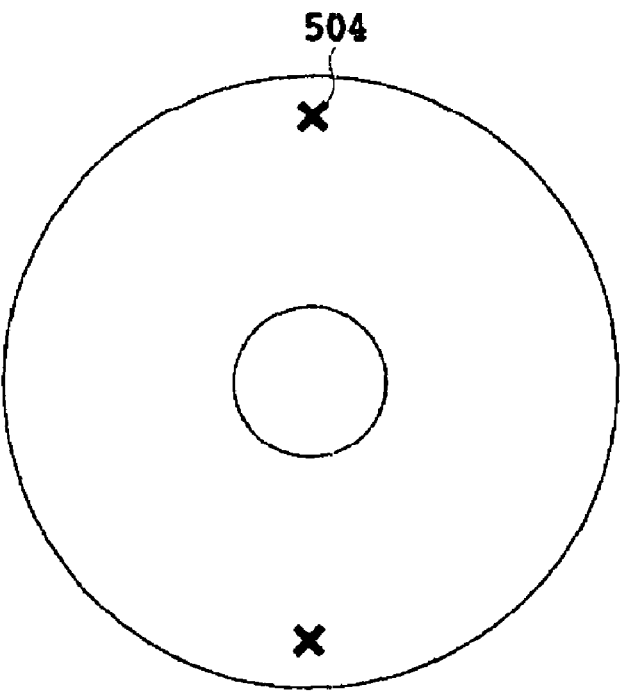

The magnetic recording medium having the alignment marks according to this invention achieved through the above manufacturing step is illustrated in FIGS. 5A–5C. Here, as shown in FIGS. 5A and 5B, the back-side alignment marks 502, which are aligned with the alignment marks provided on the master disc to be magnetically transferred to the back surface of the magnetic recording medium, are provide at the right and left sides on the front side of the magnetic recording medium. Similarly, as shown in FIGS. 5B and 5C, the front-side alignment marks 504, which are engaged with the alignment marks provided on the master disc to be magnetically transferred to the front side of the magnetic recording medium, are provided at the upper and lower sides on the back side of the magnetic recording medium. The positions of the alignment marks for the front and back sides of the magnetic recording medium are preferably outside the data area.

Figure 6A:
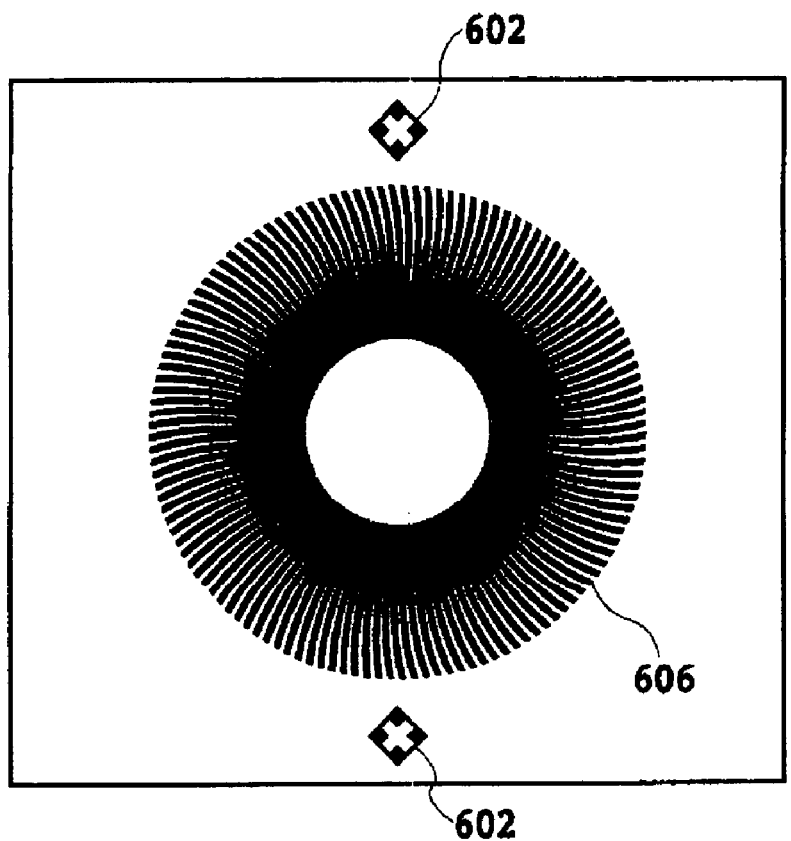
FIGS. 6A and 6B schematically illustrate master discs for the front and back sides of a magnetic recording medium according to the present invention.
Figure 6B:
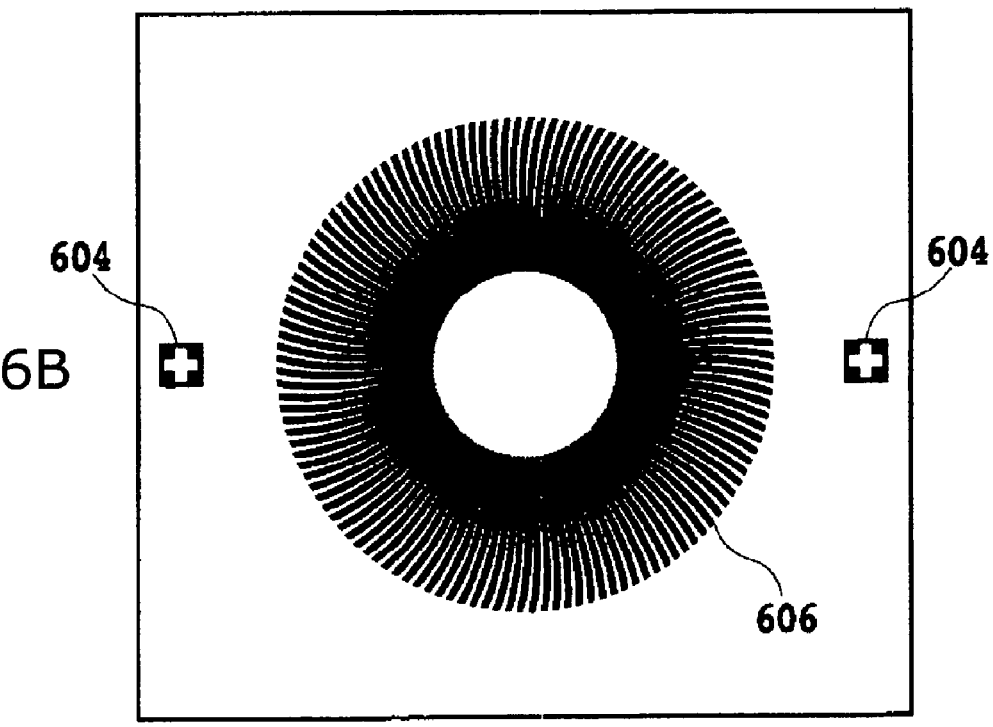

FIGS. 6A and 6B show master discs for the front and back sides, respectively. As shown in FIG. 6A, front-side alignment marks 602 for positioning relative to the front side of the magnetic recording medium are provided at the upper and lower sides on the master disc. Furthermore, as shown in FIG. 6B, back-side alignment marks 604 for positioning relative to the back side of the magnetic recording medium are provided at the right and left sides on the master disc. A magnetic pattern (soft magnetic material pattern) 606 of the soft magnetic film for magnetic transfer is embedded in the silicon substrate. Provision of the alignment marks to the master disc can be carried out without increasing the number of steps by carrying out the light exposure and etching of the magnetic pattern simultaneously in the method of manufacturing the master disc shown in FIGS. 10A–10E.

The shape of the master disc shown in FIGS. 6A and 6B is rectangular, but it can also be circular.

Referring to FIGS. 7A–7C, data from the master disc to the magnetic recording medium can be transferred to a magnetic recording medium, such as using an alignment positioning mechanism shown in FIG. 2. Referring to FIG. 7A, this mechanism can be formed by placing two alignment mark aligning CCD cameras 710 and 712 in an existing magnetic transfer device. Specifically, the alignment mark aligning CCD cameras 710 and 712 are disposed so that alignment marks 704 of a master disc can be observed. The master disc 702 is set in the magnetic transfer device as described above so that the alignment marks 704 provided on the magnetic transfer surface of the master disc is located within the visual fields of the alignment-mark aligning CCD cameras 710 and 712. Images picked up by the CCD cameras are stored. The images picked up and recorded by the alignment-mark aligning CCD cameras 710 and 712 (recorded images) are represented by A1 and A2, respectively.

Referring to FIG. 7B, the alignment marks on the magnetic recording medium is observed by placing the magnetic recording medium 404 below the master disc 702. At this time, the magnetic recording medium 404 is positioned so that the surface on which the front-side alignment marks 708 corresponding to the master disc for carrying out the magnetic transfer are provided is placed face down (on the back side thereof). Also, the front-surface alignment marks 708 are located within the visual fields of the alignment-mark aligning CCD cameras 710 and 712. Images picked up by the alignment-mark aligning CCD cameras 710 and 712 and the recorded images of the alignment marks 704 of the master disc are overlapped with each other. FIG. 7B shows the state in which the images (observed images) B1 and B2 newly picked up by the CCD cameras 710 and 712 are superposed on the recorded images A1 and A2. The X-Y stage/rotating stage on which the magnetic recording medium 404 is mounted can be adjusted so that the alignment marks of the master disc 702 and the magnetic recording medium 404 are aligned with each other on each image in which the respective alignment marks are overlapped with each other. FIG. 7C illustrates the recorded images A1, A2 and the observed images B1, B2 when the position of the magnetic recording medium is properly adjusted and aligned.

Figure 8A:
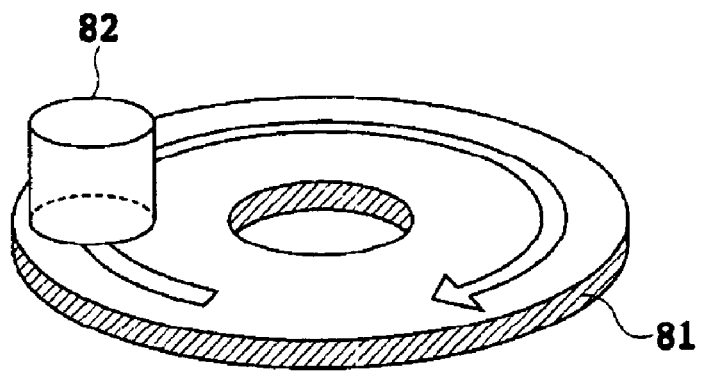
FIGS. 8A–8C schematically illustrate a conventional method of carrying out magnetic transfer onto a magnetic recording medium.
Figure 8B:
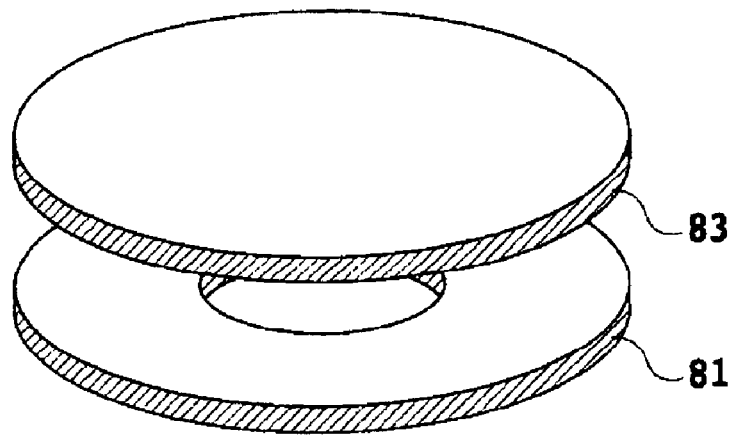
Figure 8C:
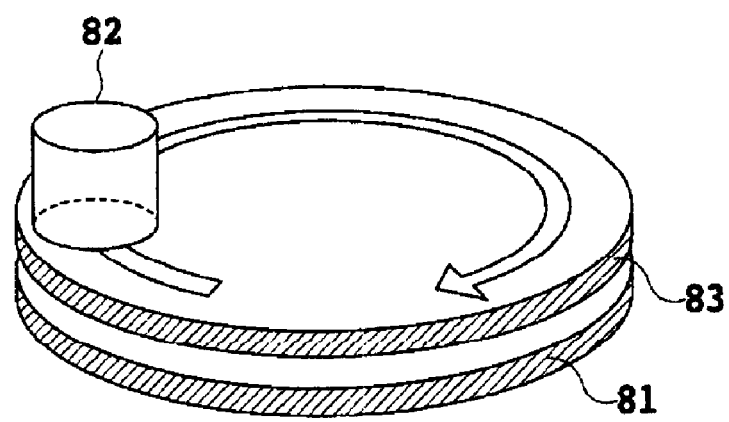
Figure 9A:
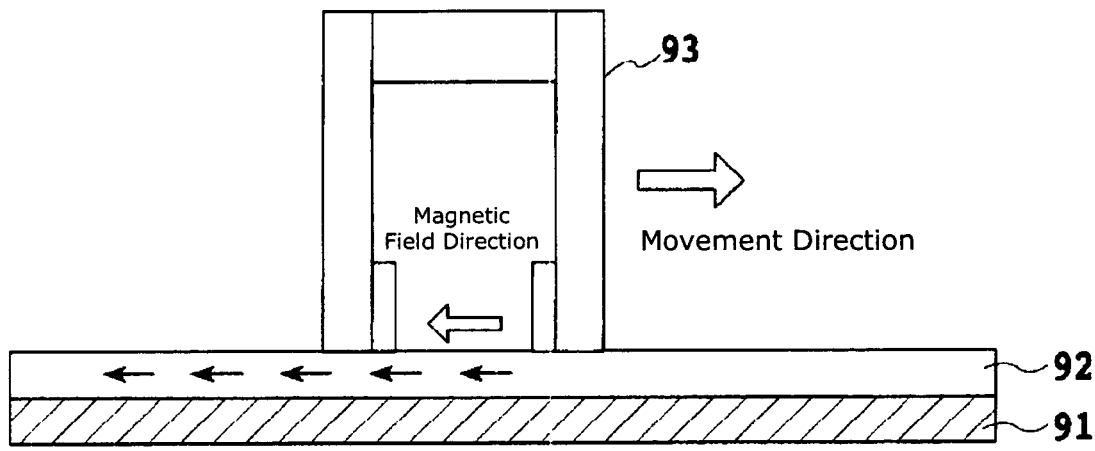
FIGS. 9A and 9B schematically illustrate a conventional principle of magnetic transfer to a magnetic recording medium.
Figure 9B:
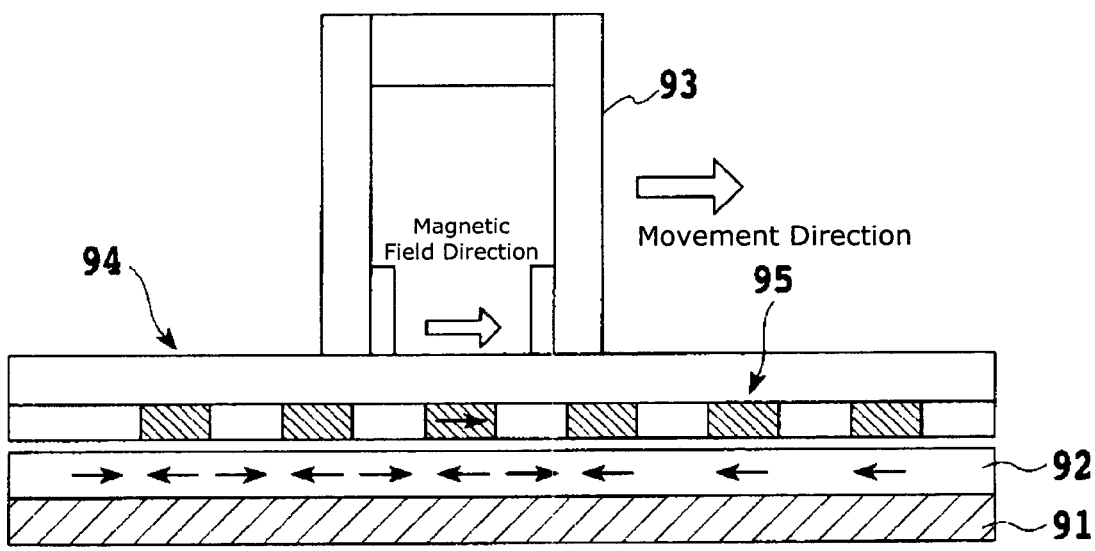
Figure 10A:
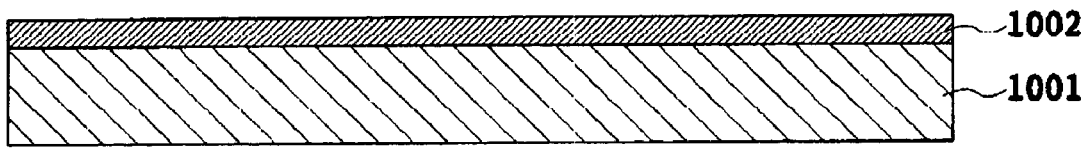
FIGS. 10A–10E schematically illustrate a conventional method of manufacturing a master disc.
Figure 10B:
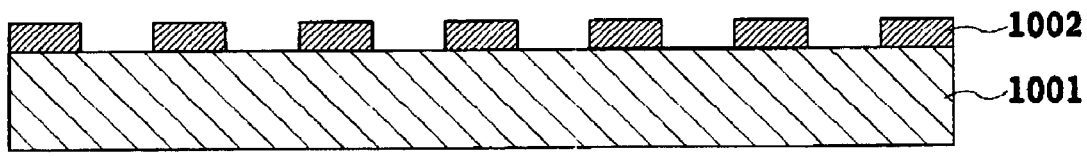
Figure 10C:
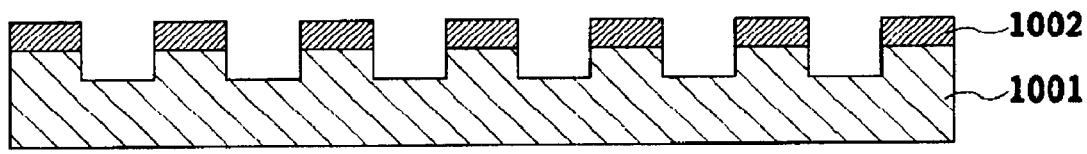
Figure 10D:
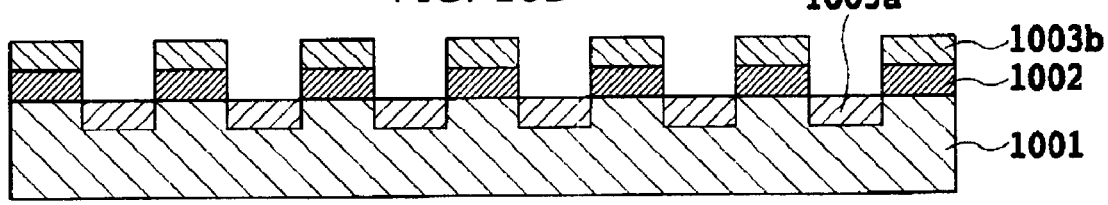
Figure 10E:
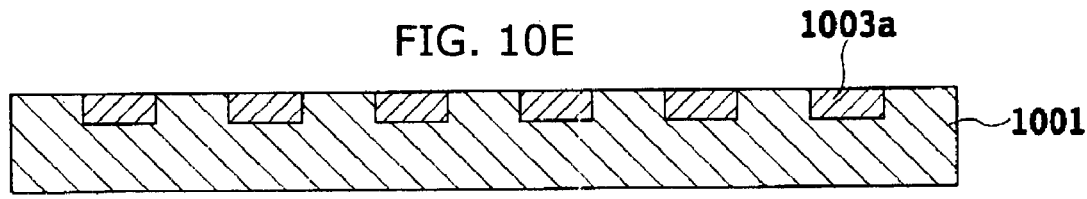

As shown in FIG. 7C, when the alignment marks for the magnetic transfer (not shown) to one surface are engaged or mated, the magnetic recording medium and the master disc are brought into close contact with each other, and an external magnetic field is applied as shown in FIGS. 8B and 9C to perform the magnetic transfer. Through the above procedure, the magnetic transfer to one surface is completed.

With respect to the other side, the master disc 702 is exchanged for the back-side master disc, the magnetic recording medium is turned over, and then the same process is repeated so that magnetic transfer can be carried out on both sides in the mechanism illustrated in FIGS. 7A–7C. Thus, both sides of the magnetic recording medium can be formed with magnetic patterns.

The alignment marks of the master disc are provided at the same position as the embedding surface of the soft magnetic material in this embodiment. However, they can be provided on the opposite surface to the embedding surface of the soft magnetic material. In this case, in the alignment-mark positioning mechanism shown in FIGS. 7A–7C, the CCD cameras 710 and 712 are disposed above the master disc. The magnetic recording medium 404 is first disposed to store the alignment marks thereof, and then the master disc is mounted and adjusted in position so that the alignment marks are engaged. In this case, however, the master disc can be contaminated due to movement of the master disc above the magnetic recording medium. Furthermore, the step of embedding the soft magnetic film into the master disc and the step of providing the alignment marks can be carried out separately from each other.

According to the present invention, the positioning of a magnetic pattern on the front side of a magnetic recording medium and a magnetic pattern on the back side thereof can be performed in a magnetic transfer method using a master disc, and even when a cylinder to be read/written is varied from the front side to the back side or from the back side to the front side, the data reading/writing time can be made uniform without greatly varying the time needed until the position of HAS is stabilized.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP 2003-047912 in its entirety, including the drawings, claims, and the specification thereof, is incorporated herein by reference.

What is claimed is:

1. A method of magnetically transferring a magnetic pattern from a master disc having soft magnetic material embedded therein to a magnetic recording medium, comprising the steps of:
   determining an origin of a magnetic recording medium by observing an inner or outer periphery of the magnetic recording medium;
   providing an alignment mark on a first side of the magnetic recording medium based on the origin thus determined;
   providing an alignment mark on a second side opposite the first side of the magnetic recording medium based on the alignment mark on the first face; and
   aligning a corresponding alignment mark on the master disc coincident with the alignment mark provided on the first or second side of the magnetic recording medium to transfer a magnetic pattern formed on the soft magnetic material to the magnetic recording medium,
   wherein the magnetic recording medium is rotationally alignable with the master disc using the alignment mark provided on the first or second side of the magnetic recording medium.

2. The method according to claim 1, wherein the alignment mark on the first or second side is placed outside a data area where magnetic information on the magnetic recording medium is written/read.

3. The method according to claim 1, wherein the alignment marks on the first and second sides are formed by a photo process.

4. The method according claim 1, wherein the step of providing the alignment mark on the second side comprises the steps of:
   disposing a photomask at a predetermined position to provide the alignment mark on the second side and recording an image of the photomask;
   disposing the magnetic recording medium at a predetermined position and observing an image the alignment mark provided on the first side;
   comparing the recorded image with the observed image; and
   correcting the position of the magnetic recording medium based on the comparison.

5. The method according to claim 1, wherein two or more alignment marks are provided on the master disc, and two or more alignment marks corresponding to the master disc are formed on the first or second side of the recording medium.

6. The method according to claim 4, wherein two or more alignment marks are provided on the master disc, and two or more alignment marks corresponding to the master disc are formed on the first or second side of the recording medium.

7. The method according to claim 5, wherein each of the alignment marks provided on the respective sides of the magnetic recording medium and the corresponding alignment mark provided on the master disc are configured to be engageable with each other.

8. The method according to claim 6, wherein each of the alignment marks provided on the respective sides of the magnetic recording medium and the corresponding alignment mark provided on the master disc are configured to be engageable with each other.

9. The method according to claim 1, wherein the alignment mark of the master disc is provided on a side of the master disc where the soft magnetic material is embedded, and the alignment mark provided side of the magnetic recording medium corresponding to the master disc is located opposite to the side to which the magnetic pattern is transferred by the master disc.

10. The method according to claim 4, wherein the alignment mark of the master disc is provided on a side of the master disc where the soft magnetic material is embedded, and the alignment mark provided side of the magnetic recording medium corresponding to the master disc is located opposite to the side to which the magnetic pattern is transferred by the master disc.

11. The method according to claim 5, wherein the alignment mark of the master disc is provided on a side of the master disc where the soft magnetic material is embedded, and the alignment mark provided side of the magnetic recording medium corresponding to the master disc is located opposite to the side to which the magnetic pattern is transferred by the master disc.

12. The method according to claim 7, wherein the alignment mark of the master disc is provided on a side of the master disc where the soft magnetic material is embedded, and the alignment mark provided side of the magnetic recording medium corresponding to the master disc is located opposite to the side to which the magnetic pattern is transferred by the master disc.

13. The method according to claim 1, wherein the alignment mark of the master disc is provided at the side opposite to the side where the soft magnetic material of the master disc is embedded, and the alignment-mark provided side on the magnetic recording medium corresponding to the master disc is a side to which the magnetic pattern is transferred by the master disc.

14. The method according to claim 4, wherein the alignment mark of the master disc is provided at the side opposite to the side where the soft magnetic material of the master disc is embedded, and the alignment-mark provided side on the magnetic recording medium corresponding to the master disc is a side to which the magnetic pattern is transferred by the master disc.

15. The method according to claim 5, wherein the alignment mark of the master disc is provided at the side opposite to the side where the soft magnetic material of the master disc is embedded, and the alignment-mark provided side on the magnetic recording medium corresponding to the master disc is a side to which the magnetic pattern is transferred by the master disc.

16. A magnetic transfer device comprising:
a master disc having soft magnetic material embedded on a first side thereof and an alignment mark on the first side or a second side opposite the first side; and
a magnetic recording medium having at least one alignment mark on each of a first side and a second side thereof,
wherein the alignment mark on the master disc is alignable with the alignment mark provided on the first or second side of the magnetic recording medium to transfer a magnetic pattern formed on the soft magnetic material to the magnetic recording medium,
wherein the magnetic recording medium is rotationally alignable with the master disc using the alignment mark provided on the first or second side of the magnetic recording medium.

17. The magnetic transfer device according to claim 16, wherein two or more alignment marks are provided on the master disc, and two or more alignment marks corresponding to the master disc are formed on the first or second side of the recording medium.

18. The magnetic transfer according to claim 17, wherein each of the alignment marks provided on the respective sides of the magnetic recording medium and the corresponding alignment mark provided on the master disc are engageable with each other.

19. The magnetic transfer device according to claim 17, wherein the alignment marks of the master disc is provided at the first side of the master disc where the soft magnetic material is embedded, and the alignment marks of the magnetic recording medium corresponding to the alignment marks of the master disc are located opposite to the side to which the magnetic pattern is transferred by the master disc.

20. The magnetic transfer method according to claim 17, wherein the alignment mark of the master disc is provided at the second side thereof, and the alignment mark of the magnetic recording medium corresponding to the alignment mark of the master disc is the side to which the magnetic pattern is transferred by the master disc.

21. The magnetic transfer device according to claim 16, wherein each of the alignment marks on the magnetic recording medium extends into the respective surface thereof without extending through the magnetic recording medium.

22. The magnetic transfer device according to claim 16, wherein each of the alignment marks on the magnetic recording medium is positioned off the center thereof.

23. The method according to claim 1, wherein each of the alignment marks on the magnetic recording medium extends into the respective surface thereof without extending through the magnetic recording medium.

24. The method according to claim 1, wherein each of the alignment marks on the magnetic recording medium is positioned off the center thereof.

* * * * *